June 21, 1966 C. S. MERTLER 3,257,528
THERMALLY SHIELDED THERMOSTATIC SWITCH
Filed June 5, 1963

INVENTOR.
CHARLES S. MERTLER
BY Woodling, Krost,
Granger and Rust
ATTORNEYS

United States Patent Office 3,257,528
Patented June 21, 1966

3,257,528
THERMALLY SHIELDED THERMOSTATIC SWITCH
Charles S. Mertler, Mansfield, Ohio, assignor to Stevens Manufacturing Company, Inc., a corporation of Ohio
Filed June 5, 1963, Ser. No. 285,752
5 Claims. (Cl. 200—138)

This invention relates to a thermostatic switch having particular utility in a hair dryer and also useful in other environments.

Present-day hair dryers for use in the home commonly include a motor-driven fan and an electrical resistance heater for heating the air stream produced by the fan. In such hair dryers it is highly desirable that the user be able to selectively regulate the temperature of the air stream, depending upon personal preference. For this purpose it has been the common practice to provide a selector switch connected to control the electrical power input to the heater, so that the user may select any one of several heat settings.

The present invention is directed to a thermostatic switch which is especially adapted for use in place of such a selector switch in a hair dryer. In use, the present thermostatic switch is disposed in the path of the air stream and is responsive to the temperature of the air stream to control the energization of the heater in the hair dryer. A conventional thermostatic switch would be impractical for this purpose because it would open and close at an excessively rapid rate as the heated air stream flows past. The rapid on-and-off cycling of such a thermostatic switch in this environment would cause it to wear out quickly.

In accordance with the present invention, a thermostatic switch is provided having a thermal insulation shield which retards its response to changes in the air stream temperature, thereby avoiding excessively rapid on-and-off cycling.

When used in a hair dryer the present thermostatic switch also serves as a safety switch to prevent overheating, such as if the user blocks the air outlet in some manner.

It is a general object of this invention to provide a novel and improved thermostatic switch.

It is also an object of this invention to provide such a thermostatic switch having a delayed response to temperature changes, so as to avoid on-and-off cycling at an excessively rapid rate.

It is also an object of this invention to provide such a thermostatic switch which is particularly advantageous for use in a hair dryer.

Further objects and advantages of this invention will be apparent from the following detailed description of certain presently-preferred embodiments thereof, shown in the accompanying drawing.

Figure 1:
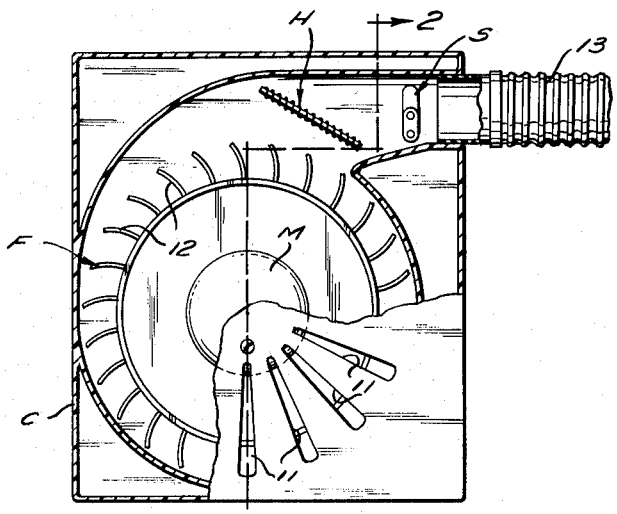
FIGURE 1 is a view, partly in elevation and partly in section, of a hair dryer embodying the present thermostatic switch in a switch unit disposed in the path of the air stream.
Figure 3:
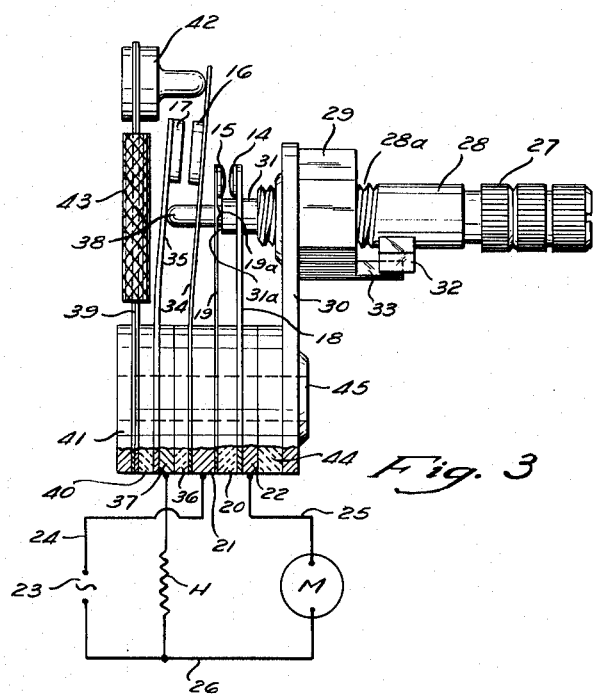
Figure 4:
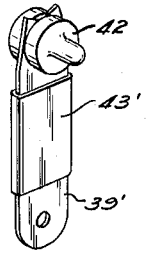

FIGURE 3 is an elevational view on an enlarged scale of the switch unit embodied in the hair dryer of FIGURE 1 and including a thermostatic switch with a heat shield in accordance with a first embodiment of the present invention; and FIGURE 4 is a perspective view of a bimetallic arm for use in a thermostatic switch of the type shown in the switch unit of FIGURE 3 and having an alternative heat shield.

Figure 2:
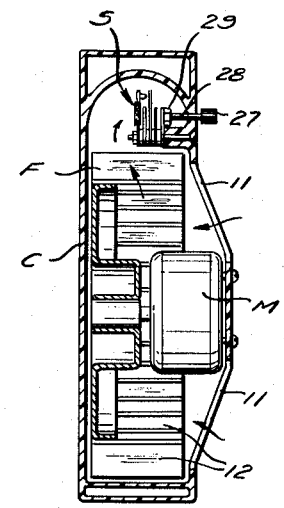
FIGURE 2 is a section taken along the line 2—2 of FIGURE 1.

Referring to the drawing, FIGURES 1 and 2 show a hair dryer embodying the thermostatic switch of the present invention. This hair dryer comprises a housing or casing C, a centrifugal blower or fan F driven by an electric motor M, an electrical resistance heater H disposed in the path of the air stream delivered by the fan, and a switch unit S disposed in the path of this air stream after the heater. Air is drawn into the interior of the fan through openings 11 in one end wall of the housing and is discharged centrifugally from between the fan vanes 12, flowing over the heater H and then over switch unit S to a hose 13 leading to a hood (not shown) adapted to be placed over the user's head.

The switch unit S, which embodies the thermostatic switch of the present invention, is shown in enlarged detail in FIGURE 3. This switch unit includes a first pair of switch contacts 14 and 15, controlling the energization of the fan motor M, and a second pair of switch contacts 16 and 17, controlling the energization of heater H.

Referring first to the motor switch, the switch contact 14 is fixedly supported by a substantially rigid metal arm 18, while the confronting switch contact 15 is mounted on the free end of a cantilever mounted, thin, flexible, resilient metal arm 19. A washer or spacer 20 of suitable electrical insulation material is sandwiched between the mounted ends of the arms 18 and 19. At this location, a metal terminal plate 21 engages the outer face of arm 19 and a similar metal terminal plate 22 engages the outer face of arm 18. As shown in FIGURE 3, the motor switch is connected in the electrical energization circuit for fan motor M such that motor M may be energized as follows: from one side of the A.C. power source 23, through a line 24, terminal plate 21, arm 19, switch contacts 15 and 14, arm 18, terminal plate 22, and line 25, through motor M, and thence through a return line 26 to the opposite side of power source 23.

The flexible switch arm 19 normally positions its contact 15 in engagement with the rigidly supported switch contact 14. That is, these contacts engage one another in the absence of an external force displacing switch arm 19 away from the rigid switch arm 18.

The position of the flexible switch arm 19, and thus the engagement of the motor switch contacts 15, 14, is under the control of a knob 27, which is disposed outside the hair dryer casing C for easy accessibility to the user, as shown in FIG. 2. This knob is on a shank 28 having a screw-threaded portion 28a which is threadedly received in a nut 29 fixedly mounted on a metal end plate 30 of the switch unit. A collar 31 of suitable electrical insulation material is attached to the shank inwardly from the end plate 30. This insulation collar passes to one side of the rigid switch arm 18 and presents a flat end face 31a, disposed in a plane extending radially of the axis of shank 28, in confronting relationship to a dimple 19a formed on the flexible switch arm 19.

When knob 27 is turned to the position shown in FIG. 3 the insulation collar 31 holds the flexible switch arm 19 to the left and maintains its switch contact 15 away from the rigidly supported switch contact 14, thus de-energizing the fan motor M. Shank 28 carries a stop lug 32 which is positioned to engage an extension 33 on nut 29. FIGURE 3 shows the position of the parts in the extreme inward position of shank 28, with its stop lug 32 engaging one side of the extension 33. When knob 27 is turned from this position, the inherent resilient bias of switch arm 19 moves its contact-carrying free end to the right. At some predetermined rotational position of knob 27 the insulation collar 31 will have been displaced to the right a sufficient distance to enable switch contact 15 to engage switch contact 14. In one practical embodiment, such engagement of the switch contacts may take place after about 60° rotation of the control knob 27 from the extreme "off" position shown in FIG. 3. Continued rotation of knob 27 in this direction will continue to retract the insulation collar 31 to the right away from the flexible switch arm 19, and the latter will resiliently maintain its contact 15 in engagement with the rigidly supported switch contact 14 to maintain the fan motor M energized. In one practical embodiment the knob 27 may be turned through a total of about 330° from its extreme "off" position before its stop lug 32 engages the opposite side of the extension 33, which engagement determines the opposite extreme limit of movement of the control knob.

The thermostatic switch in the switch unit S is connected to automatically control the energization of the heater H so as to regulate the temperature of the heated air stream produced by the hair dryer. Referring to FIG. 3, one contact 16 of the thermostatic switch is carried by a cantilever mounted, thin, flexible, resilient arm 34. The other contact 17 of the thermostatic switch is mounted on the free end of a cantilever mounted, flexible, resilient arm 35. Sandwiched between the switch arms 34 and 35 at their mounted ends are a spacer or washer 36 of electrical insulation material, engaging the inner face of arm 34, and a metal terminal plate 37, engaging the inner face of arm 35. The previously-mentioned terminal plate 21 engages the outer face of arm 34. The electrical energization circuit for the electrical heater H is from one side of power source 23 through line 24, terminal plate 21, switch arm 34, switch contacts 16 and 17, switch arm 35, and terminal plate 37, through heater H to the return line 26 leading to the opposite side of the power source.

Switch arm 34 has an inherent resilient bias acting to position its free end to the left of the position shown in FIG. 3.

Switch arm 35 has an inherent resilient bias acting to position its free end to the right of the position shown in FIG. 3 (i.e., toward the confronting switch contact 16).

A reduced diameter extension 38 of the previously-mentioned insulation collar 31 carried by shank 28 extends freely through an opening in switch arm 34 into the path of movement of switch arm 35 to the right in FIG. 3. In the extreme "off" position shown in FIG. 3, this insulation member 38 holds switch arm 35 retracted away from switch arm 34 and maintains the switch contacts 17, 16 apart. As the control knob 27 is turned from this full "off" position, the insulation member 38 is retracted to the right in FIG. 3, permitting the free end of switch arm 35 to move to the right for positioning its contact 17 in engagement with switch contact 16.

The engagement of contacts 17 and 16 depends also upon the position of switch arm 34, which is determined by a temperature-responsive bimetal element 39. The latter is mounted in cantilever fashion between an insulation washer 40, which engages the outer face of switch arm 35, and a metal end piece 41. At its free end the bimetal element 39 carries an abutment member 42 of electrical insulation material which is adapted to limit the movement of the free end of switch arm 34 to the left in FIG. 3 under the influence of its own inherent resilient bias.

The bimetal element 39 is of the usual laminated construction of two dissimilar metals having different rates of heat expansion. The arrangement is such that at normal room temperatures the bimetal element 39 will position the abutment 42, as shown in FIG. 3, so as to limit the movement of the free end of switch arm 34 to the left. As the bimetal element 39 is heated, it moves its free end progressively to the right, thereby retracting the free end of the switch arm 34 further to the right against its own inherent resilient bias.

It will be apparent, therefore, that the engagement and disengagement of the switch contacts 16, 17 is controlled conjointly by control knob 27, which determines the position of contact 17, and the bimetal element 39, which determines the position of contact 16.

As shown in FIGURE 3, a rivet 45 extending from the end plate 41 holds the mounted end of the bimetal element 39, the insulation spacer 40, the mounted end of switch arm 35, terminal plate 37, insulation spacer 36, the mounted end of switch arm 34, terminal plate 21, the mounted end of switch arm 19, insulation spacer 20, the mounted end of switch arm 18, terminal plate 22, an insulation washer 44 and the end plate 30 assembled end-to-end in the order named.

In the extreme "off" position of control knob 27, the switch contacts 16, 17 are separated, as shown in FIG. 3. In one practical embodiment, the motor switch contacts 14, 15 close after about 60° rotation of knob 27 from its extreme "off" position, as described. At this time, the thermostatic switch contact 17 will have moved toward switch contact 16 but they are still apart, assuming that the temperature is within the range of normal room temperatures.

After an additional approximately 60° rotation of knob 27 (still assuming normal room temperature) the thermostatic switch contact 17 will engage contact 16 and this engagement will be maintained throughout any additional rotation of knob 27 at this time.

With heater H energized, the air stream flowing past the switch unit S in FIG. 1 will heat the bimetal element 39 and, at a predetermined temperature of the latter, as determined by the setting of the control knob 27, the abutment member 42 on its free end will have moved far enough to the right to engage the free end of switch arm 34 and move the latter's switch contact 16 out of engagement with switch contact 17.

With heater H now de-energized, the air stream will cool down, causing the free end of bimetal element 39 to move to the left, thereby enabling contacts 16 and 17 to close again.

This action is repeated cyclically, with the switch contacts 16, 17 opening and closing to turn heater H on and off so as to hold the temperature of the air stream between lower and upper limits.

In accordance with the present invention a novel shielding arrangement is provided to retard the response of the bimetal element 39 to temperture changes in the air stream flowing past it.

In FIGURE 3 this shielding arrangement is in the form of a sleeve 43 of heat insulation material which loosely surrounds the bimetal element 39 for most of the latter's length between its mounted end and the abutment member 42 on its free end.

In the absence of such a shielding arrangement the bimetal element 39 would respond so quickly to ambient temperature changes that it would cause the switch contacts 16, 17 to close and open cyclically at an excessively rapid rate, producing contact chatter and "frying" and causing the thermostatic switch to wear out rapidly.

However, with a thermal shielding arrangement as shown in FIG. 3 the bimetal element 39 responds more slowly to ambient temperature changes in either direction. In effect, therefore, the sensitivity of the thermostatic switch is reduced. It has been found that this effectively avoids contact chatter and "frying," as well as prolonging the useful life of the switch by reducing the rate at which it cycles on and off.

FIGURE 4 shows an alternative shielding arrangement for the bimetal element in the form of a heat insulation tape 43' wrapped around the bimetal element 39'. Preferably, this bimetal element 39' will be arranged in the switch unit S in the same manner as the bimetal element 39 in FIG. 3.

It will be apparent that each of the illustrated embodiments constitutes a simple and inexpensive solution to the problem of making feasible the use of a thermostatic switch in the particular environment under discussion, namely, to control the temperature of the heated air stream in a hair dryer. The present thermostatic switch, in addition to controlling the air stream temperature, also acts as a safety switch preventing overheating of the hair dryer, such as if the user accidentally blocks the air passage through hose 13.

While certain presently-preferred embodiments and a specific practical application of the invention have been shown and described, it is to be understood that various modifications, omissions and refinements which depart from the disclosed embodiments may be adopted without departing from the spirit and scope of this invention. For example, the thermostatic switch of the present invention may be completely separate from the motor switch, if desired.

I claim:
1. A thermostatic switch comprising, a base, a pair of cantilever-mounted, flexible, resilient arms mounted on said base and having movable portions, a pair of contacts mounted respectively on said movable portions of the arms and confronting one another for engagement with one another, a cantilever-mounted, temperature sensitive bimetal element mounted on said base and having a portion which is movable in response to temperature changes to which said bimetal element is exposed, said bimetal element having two sides, insulator means on said movable portion of the bimetal element acting on one of said arms to move said contacts apart when said bimetal element is heated to a predetermined temperature, and a thermal insulation shield loosely extending around said bimetal element between said cantilever-mounted portion and said insulator means and retarding the latter's response to ambient temperature changes by retarding heat flow to both sides of said bimetal element to have heat flow into the element primarily from the ends of said insulation shield from the ambient air.

2. The thermostatic switch of claim 1 wherein said thermal insulation shield is a sleeve of thermal insulation material loosely surrounding said bimetal element.

3. A thermostatic switch comprising, in combination, a base,
first and second contact blades having one portion mounted on said base,
first and second engageable contacts mounted on movable portions of said first and second blades, respectively,
a bimetal blade having two sides and a portion mounted on said base and having a portion movable with temperature changes relative to said base,
insulator means acting between said movable portion of said bimetal blade and one of said contact blades to relatively actuate said first and second contacts,
adjustment means carried on said base and acting on one of said contact blades to relatively adjust said first and second contacts,
and a sleeve of thermal insulating material having two ends and loosely surrounding said bimetal blade to retard heat flow to both sides of said bimetal blade and to have heat flow into said bimetal blade primarily from the two ends of said sleeve from the ambient air.

4. In combination with motor means for producing a stream of air and an electrically energized heater for heating the air stream, the improvement comprising,
a thermostatic switch having a base,
first and second contact blades having one portion mounted on said base,
first and second engageable contacts mounted on movable portions of said first and second blades, respectively,
a bimetal blade having a portion mounted on said base and having a portion movable with temperature changes relative to said base,
means to have said movable portion of said bimetal blade act on said first contact blade to relatively actuate said first and second contacts,
manual adjustment means carried on said base to act on said second contact blade to relatively adjust said first and second contacts,
connection means connectable to an energy source for energizing the heater through said first and second contacts for adjusting the temperature of the heated air stream,
a thermal insulating sleeve surrounding said bimetal blade,
and said thermostatic switch being mountable downstream from the heater to have the heated air pass over said thermally insulated bimetal blade to establish a time lag in the operation of said first and second contacts by said bimetal blade to lengthen the on and off cycles of said first and second contacts.

5. In combination with motor means for producing a stream of air and an electrically energized heater for heating the air stream, the improvement comprising,
a thermostatic switch having a base,
first and second contact blades having one portion mounted on said base,
first and second contacts mounted on movable portions of said first and second blades, respectively,
third and fourth contact blades having a portion mounted on said base,
third and fourth contacts mounted on movable portions of said third and fourth contact blades, respectively,
said first and second contacts being engageable,
said third and fourth contacts being engageable,
a bimetal blade having a portion mounted on said base and having a portion movable with temperature changes relative to said base,
means to have said movable portion of said bimetal blade act on said first contact blade to relatively actuate said first and second contacts,
manual adjustment means carried on said base to act on said second contact blade to relatively adjust said first and second contacts through an adjustable operating temperature range,
lost motion means acting between said manual adjustment means and said fourth contact blade to relatively adjust said third and fourth contacts near one limit of adjustment movement of said second contact blade,
connection means connectable to an energy source for energizing the heater through said first and second contacts for adjusting the temperature of the heated air stream,
connection means connectable to an energy source for energizing the motor means through said third and fourth contacts to be energized throughout a major portion of the adjustment range of said manual adjustment means,
a thermal insulating sleeve loosely surrounding said bimetal blade,
and said thermostatic switch being mountable downstream from the heater to have the heated air pass transversely over said thermally insulated bimetal blade to establish a time lag in the operation of said first and second contacts by said bimetal blade to lengthen the on and off cycles of said first and second contacts.

References Cited by the Examiner

UNITED STATES PATENTS

| 2,527,775 | 10/1950 | Sutton | 200—138 X |
| 2,565,638 | 8/1951 | Victory | 200—122 X |
| 2,623,137 | 12/1952 | Vogelsberg | 200—122 |
| 3,078,361 | 2/1963 | Mason et al. | 200—122 X |

FOREIGN PATENTS 605,950   8/1948   Great Britain.

BERNARD A. GILHEANY, *Primary Examiner.*

L. A. WRIGHT, *Assistant Examiner.*